(12) United States Patent
Liu et al.

(10) Patent No.: US 12,035,382 B2
(45) Date of Patent: Jul. 9, 2024

(54) DATA TRANSMISSION METHOD AND COMMUNICATIONS DEVICE

(71) Applicant: HUAWEI TECHNOLOGIES CO., LTD., Guangdong (CN)

(72) Inventors: Yalin Liu, Shanghai (CN); Peter Loc, Cupertino, CA (US); Xun Yang, Shenzhen (CN); Jun Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/560,011

(22) Filed: Dec. 22, 2021

(65) Prior Publication Data
US 2022/0191952 A1    Jun. 16, 2022

Related U.S. Application Data

(63) Continuation of application No. 16/567,267, filed on Sep. 11, 2019, now Pat. No. 11,252,766, which is a
(Continued)

(51) Int. Cl.
*H04W 76/10* (2018.01)
*H04L 5/00* (2006.01)
(Continued)

(52) U.S. Cl.
CPC ........... *H04W 76/10* (2018.02); *H04L 5/0044* (2013.01); *H04L 27/2602* (2013.01);
(Continued)

(58) Field of Classification Search
CPC ... H04W 76/10; H04W 40/244; H04W 72/04; H04W 84/12; H04W 88/08;
(Continued)

(56) References Cited

U.S. PATENT DOCUMENTS 7,978,729 B2    7/2011   Moorti et al.
8,462,863 B1    6/2013   Zhang et al.
(Continued)

FOREIGN PATENT DOCUMENTS

CN    101848063 A    9/2010
CN    102811119      12/2012
(Continued)

OTHER PUBLICATIONS

Choi et al., "Method for Setting Operating Channels in White Space Region, and Apparatus Therefore", English translation of WO 2013176394, Nov. 2013 (Year: 2013).*
(Continued)

*Primary Examiner* — Michael K Phillips
(74) *Attorney, Agent, or Firm* — Fish & Richardson P.C.

(57) ABSTRACT

The present invention provides a data transmission method and a communications device. The communications device includes: a transceiver, configured to send a transmission frame to a second communications device, so that the second communications device acquires data information in the transmission frame, where the transmission frame includes a first part and a second part, the transceiver sends the first part of the transmission frame by using a first quantity of subcarriers, the transceiver sends the second part of the transmission frame by using a second quantity of subcarriers, and the first quantity is not equal to the second quantity; and the transceiver, further configured to perform a next time of information transmission with the second communications device. A throughput can be effectively increased.

20 Claims, 3 Drawing Sheets

Related U.S. Application Data continuation of application No. 15/221,241, filed on Jul. 27, 2016, now Pat. No. 10,470,223, which is a continuation of application No. PCT/CN2014/071688, filed on Jan. 28, 2014.

(51) Int. Cl.

| | | |
|---|---|---|
| *H04L 27/26* | (2006.01) | |
| *H04W 40/24* | (2009.01) | |
| *H04W 72/04* | (2023.01) | |
| *H04W 84/12* | (2009.01) | |
| *H04W 88/08* | (2009.01) | |

(52) U.S. Cl.
CPC ........ *H04L 27/2603* (2021.01); *H04L 27/265* (2013.01); *H04W 40/244* (2013.01); *H04W 72/04* (2013.01); *H04W 84/12* (2013.01); *H04W 88/08* (2013.01)

(58) Field of Classification Search
CPC .............. H04L 5/0044; H04L 27/2602; H04L 27/2603; H04L 27/265
See application file for complete search history.

(56) References Cited

U.S. PATENT DOCUMENTS

| | | | |
|---|---|---|---|
| 8,665,906 B1 * | 3/2014 | Liu | H04W 28/18 370/473 |
| 10,470,223 B2 * | 11/2019 | Liu | H04L 27/265 |
| 11,252,766 B2 * | 2/2022 | Liu | H04L 27/2602 |
| 2007/0268975 A1 | 11/2007 | Yoon et al. | |
| 2009/0109950 A1 | 4/2009 | Richardson et al. | |
| 2009/0285321 A1 | 11/2009 | Schulz et al. | |
| 2010/0002570 A9 * | 1/2010 | Walton | H04B 7/0413 370/208 |
| 2011/0026623 A1 | 2/2011 | Srinivasa et al. | |
| 2011/0255620 A1 | 10/2011 | Jones et al. | |
| 2012/0002756 A1 | 1/2012 | Zhang et al. | |
| 2012/0127940 A1 | 5/2012 | Lee et al. | |
| 2012/0281774 A1 | 11/2012 | Lee et al. | |
| 2012/0320890 A1 | 12/2012 | Zhang et al. | |
| 2012/0324315 A1 * | 12/2012 | Zhang | H04L 1/0025 714/776 |
| 2013/0136075 A1 | 5/2013 | Yu et al. | |
| 2013/0142115 A1 | 6/2013 | Yu et al. | |
| 2013/0188572 A1 * | 7/2013 | Cheong | H04W 16/14 370/329 |
| 2013/0242901 A1 | 9/2013 | Kuo | |
| 2014/0023156 A1 | 1/2014 | Zhang et al. | |
| 2014/0307650 A1 | 10/2014 | Vermani et al. | |
| 2015/0023272 A1 * | 1/2015 | Choi | H04L 25/0226 370/329 |
| 2015/0023335 A1 | 1/2015 | Vermani et al. | |
| 2015/0063255 A1 | 3/2015 | Tandra et al. | |
| 2015/0063257 A1 | 3/2015 | Merlin et al. | |
| 2015/0071372 A1 | 3/2015 | Zhang | |
| 2015/0103720 A1 | 4/2015 | Loc et al. | |
| 2015/0117433 A1 | 4/2015 | Zhang et al. | |
| 2015/0131517 A1 | 5/2015 | Chu et al. | |
| 2015/0139119 A1 | 5/2015 | Azizi et al. | |
| 2015/0139206 A1 | 5/2015 | Azizi et al. | |
| 2015/0295621 A1 | 10/2015 | Wang | |
| 2015/0349862 A1 | 12/2015 | Yang et al. | |
| 2016/0072654 A1 | 3/2016 | Choi et al. | |
| 2016/0143010 A1 * | 5/2016 | Kenney | H04L 27/2695 370/329 |
| 2016/0204968 A1 | 7/2016 | Zhang | |
| 2016/0211961 A1 | 7/2016 | Azizi et al. | |
| 2016/0234779 A1 | 8/2016 | Kenney et al. | |
| 2016/0242173 A1 | 8/2016 | Li et al. | |
| 2016/0249381 A1 * | 8/2016 | Choi | H04W 74/006 |
| 2016/0301451 A1 | 10/2016 | Seok | |

FOREIGN PATENT DOCUMENTS

| | | | | |
|---|---|---|---|---|
| CN | 103117833 A | * | 5/2013 | |
| CN | 103138870 A | | 6/2013 | |
| CN | 103229445 | | 7/2013 | |
| CN | 103517386 | | 1/2014 | |
| CN | 101584171 | | 11/2019 | |
| EP | 2410761 | | 1/2015 | |
| JP | 2013504248 | | 2/2013 | |
| JP | 2013531955 | | 8/2013 | |
| JP | 2013192231 | | 9/2013 | |
| KR | 20100071116 | | 6/2010 | |
| WO | 2012003355 | | 1/2012 | |
| WO | 2012121909 | | 9/2012 | |
| WO | WO-2013037303 A1 | * | 3/2013 | ......... H04L 12/1886 |
| WO | WO-2013176394 A1 | * | 11/2013 | ............ H04W 16/14 |

OTHER PUBLICATIONS

Kang et al., "A Shielding Device and Shielding Method of Wireless Local Area Network", English translation of CN 103117833, May 2013 (Year: 2013).*
Gao et al., "Multicast Packet Transmission Method, Station Device, and Service Set System", English translation of WO 2013037303, Mar. 2013 (Year: 2013).*
Communication pursuant to Article 94(3) EPC issued in European Application No. 14880418.0 on Feb. 20, 2019, 5 pages.
IEEE 802.11-2012, "Part 11: Wireless LAN Medium Access Control{MAC) and Physical Layer(PHY) Specifications, IEEE Computer Society," Mar. 29, 2012, 2793 pages.
Notice of Allowance issued in Japanese Application No. 2016-548675 on Jan. 8, 2019, 5 pages (with English translation).
Office Action issued in Chinese Application No. 201480051768.x on Sep. 30, 2018, 6 pages.
Office Action issued in Chinese Application No. 201480051768.x on Sep. 30, 2018, (with English translation).
Sahin et al., "Multi-User Aware Frame Structure for OFDMA Based System," 2012 IEEE Vehicular Technology Conference (VCT Fall.), IEEE, Sep. 2012, 5 pages.
Search Report issued in Chinese Application No. 201480051768 on Sep. 20, 2018, 2 pages.
XP68062948A, Jinyoung Chun, "Legacy support on HEW frame structure; IEEE 802.11-13-1057-00-0 hew-legacy-support-on-hew-frame-structure," Sep. 16, 2013, 8 pages.
Yoon Young et al., "A method and structure of configuring preamble transmission of data symbol in a wireless communication system," Nov. 18, 2009, (with English translation).

* cited by examiner

| Subcarrier quantity → | First quantity | Second quantity |
|---|---|---|
| Transmission frame → | First part | Second part |

FIG. 1

| First part | | | | Second part | | |
|---|---|---|---|---|---|---|
| L-STF | L-LTF | L-SIG | HEW-SIG | Control information | | Data information |

No space or relatively small space

FIG. 2

| First part | | | Second part | | |
|---|---|---|---|---|---|
| L-STF | L-LTF | L-SIG | Control information | | Data information |

No space or relatively small space

FIG. 3

DATA TRANSMISSION METHOD AND COMMUNICATIONS DEVICE

CROSS REFERENCE TO RELATED APPLICATIONS

This application is a continuation of U.S. patent application Ser. No. 16/567,267, filed on Sep. 11, 2019, which is a continuation of U.S. patent application Ser. No. 15/221,241, filed on Jul. 27, 2016, now U.S. Pat. No. 10,470,223, which is a continuation of International Application No. PCT/CN2014/071688, filed on Jan. 28, 2014. All of the aforementioned patent applications are hereby incorporated by reference in their entireties.

TECHNICAL FIELD

The present invention relates to the communications technologies, and in particular, to a data transmission method and a communications device.

BACKGROUND

To meet daily increasing application requirements of users, wireless local area network standards have been evolving rapidly in the past years, and have been developing from the United States Institute of Electrical and Electronics Engineers (Institute of Electrical and Electronics Engineers, IEEE for short hereinafter) 802.11a/b/g to IEEE 802.11n and then to IEEE 802.11ac. Bandwidths that are supported in the wireless local area network standards also keep increasing, where a bandwidth of 20 MHz is supported in IEEE 802.11a/b/g, bandwidths of 20 MHz and 40 MHz are supported in IEEE 802.11n, and then bandwidths of 20 MHz, 40 MHz, 80 MHz, and 160 MHz are supported in IEEE 802.11ac. A high efficiency wireless local area network (High Efficiency WLAN, HEW for short hereinafter) system that is being researched even supports a larger bandwidth.

In the prior art, an example in which IEEE 802.11n supports 40 MHz is used. To increase a throughput of a wireless local area network system, a physical layer protocol data unit (Physical layer Protocol Data Unit, PPDU for short hereinafter) transmitted between a wireless access point (Access Point, AP for short hereinafter) and user equipment includes two parts: a preamble and data. In the part of the preamble, a legacy short training field (Legacy Short Training Field, L-STF for short hereinafter), a legacy long training field (Legacy Long Training Field, L-LTF for short hereinafter), legacy signaling (Legacy Signaling, L-SIG for short hereinafter), and high throughput signaling (High Throughput Signaling, HT-SIG for short hereinafter) are transmitted on 2 pieces of 20 MHz (that is, transmitted on 2*64=128 subcarriers), and a high throughput short training field (High Throughput Short Training Field, HT-STF for short hereinafter), a high throughput long training field (High Throughput Long Training Field, HT-LTF for short hereinafter), and a high throughput data (High Throughput Data, HT-Data for short hereinafter) part are transmitted on a channel of 40 MHz (that is, transmitted on 128 subcarriers), so as to make a throughput of a system supporting 40 MHz in IEEE 802.11n larger than a throughput of a system supporting 20 MHz in IEEE 802.11n or IEEE802.11a.

However, in the prior art, a change (increase or decrease) in a throughput of a system is limited.

SUMMARY

Embodiments of the present invention provide a data transmission method and a communications device, so as to resolve a problem in the prior art that a throughput cannot be flexibly changed according to a requirement, and an extent of a change to a throughput is limited.

A first aspect of embodiments of the present invention provides a communications device, including:

a transceiver, configured to send a transmission frame to a second communications device, so that the second communications device acquires data information in the transmission frame, where the transmission frame includes a first part and a second part, the transceiver sends the first part of the transmission frame by using a first quantity of subcarriers, the transceiver sends the second part of the transmission frame by using a second quantity of subcarriers, and the first quantity is not equal to the second quantity; and the transceiver, further configured to perform a next time of information transmission with the second communications device.

With reference to the first aspect, in a first possible implementation manner of the first aspect, the transceiver is specifically configured to perform the next time of information transmission with the second communications device by using the second quantity of subcarriers.

With reference to the first possible implementation manner of the first aspect, in a second possible implementation manner of the first aspect, the first quantity being not equal to the second quantity includes:

transmission bandwidths used by the first part of the transmission frame and the second part of the transmission frame are equal, and an spacing of the first quantity of subcarriers is not equal to an spacing of the second quantity of subcarriers.

With reference to the first possible implementation manner of the first aspect, in a third possible implementation manner of the first aspect, the first quantity being not equal to the second quantity includes:

a transmission bandwidth used by the first part of the transmission frame and a transmission bandwidth used by the second part of the transmission frame are not equal, and an spacing of the first quantity of subcarriers is equal to an spacing of the second quantity of subcarriers.

With reference to the first possible implementation manner of the first aspect, in a fourth possible implementation manner of the first aspect, the first quantity being not equal to the second quantity includes:

transmission bandwidths used by the first part of the transmission frame and the second part of the transmission frame are not equal, and an spacing of the first quantity of subcarriers is not equal to an spacing of the second quantity of subcarriers.

With reference to any one of the first aspect to the fourth possible implementation manner of the first aspect, in a fifth possible implementation manner of the first aspect, the first quantity being not equal to the second quantity is specifically:

the first quantity is less than the second quantity, and the spacing of the first quantity of subcarriers is 312.5 kHz.

With reference to any one of the first aspect to the fifth possible implementation manner of the first aspect, in a sixth possible implementation manner of the first aspect, the first part of the transmission frame includes a preamble part of the transmission frame, the second part of the transmission frame includes a data part of the transmission frame, and the preamble part of the transmission frame carries information required for the second communications device to demodulate the second part of the transmission frame.

With reference to the sixth possible implementation manner of the first aspect, in a seventh possible implementation manner of the first aspect, the preamble part of the transmission frame includes a legacy short training field L-STF, a legacy long training field L-LTF, legacy signaling L-SIG, and a high efficiency wireless local area network signaling HEW-SIG, where the HEW-SIG carries the information required for the second communications device to demodulate the second part of the transmission frame.

With reference to the seventh possible implementation manner of the first aspect, in an eighth possible implementation manner of the first aspect, the HEW-SIG carrying the information required for the second communications device to demodulate the second part of the transmission frame is specifically:
the HEW-SIG carries subcarrier quantity information used by the second part of the transmission frame and/or MCS information of the second part of the transmission frame.

With reference to the sixth possible implementation manner of the first aspect, in a ninth possible implementation manner of the first aspect, the preamble part of the transmission frame includes an L-STF, an L-LTF, and an L-SIG, where the L-SIG carries the information required for the second communications device to demodulate the second part of the transmission frame.

With reference to the ninth possible implementation manner of the first aspect, in a tenth possible implementation manner of the first aspect, the L-SIG carrying the information required for the second communications device to demodulate the second part of the transmission frame is specifically:
the L-SIG carries subcarrier quantity information used by the second part of the transmission frame and/or MCS information of the second part of the transmission frame.

With reference to any one of the first aspect to the tenth possible implementation manner of the first aspect, in an eleventh possible implementation manner of the first aspect, the data part of the transmission frame includes control information and the data information, where the control information includes at least one type of the following information: scheduling information, broadcast information, and system information.

With reference to the eleventh possible implementation manner of the first aspect, in a twelfth possible implementation manner of the first aspect, the communications device is a wireless access point AP, and the second communications device is at least one user station STA.

A second aspect of embodiments of the present invention provides a communications device, including:
a transceiver, configured to receive a transmission frame sent by a first communications device, where the transmission frame includes a first part and a second part, the first part of the transmission frame is sent by the first communications device by using a first quantity of subcarriers, the second part of the transmission frame is sent by the first communications device by using a second quantity of subcarriers, the transceiver receives the first part of the transmission frame by using Fourier transform of the first quantity, and the transceiver receives the second part of the transmission frame by using Fourier transform of the second quantity; and further configured to: after a processor acquires data information in the transmission frame, perform a next time of information transmission with the first communications device; and
the processor, configured to acquire the data information in the transmission frame.

With reference to the second aspect, in a first possible implementation manner of the second aspect, the communications device is a user station STA, and the first communications device is a wireless access point AP.

A third aspect of embodiments of the present invention provides a communications device, including:
a transceiver module, configured to send a transmission frame to a second communications device, so that the second communications device acquires data information in the transmission frame, where the transmission frame includes a first part and a second part, the transceiver module sends the first part of the transmission frame by using a first quantity of subcarriers, the transceiver module sends the second part of the transmission frame by using a second quantity of subcarriers, and the first quantity is not equal to the second quantity; and the transceiver module, further configured to perform a next time of information transmission with the second communications device.

With reference to the third aspect, in a first possible implementation manner of the third aspect, the transceiver module is specifically configured to perform the next time of information transmission with the second communications device by using the second quantity of subcarriers.

With reference to the first possible implementation manner of the third aspect, in a second possible implementation manner of the third aspect, the first quantity being not equal to the second quantity includes:
transmission bandwidths used by the first part of the transmission frame and the second part of the transmission frame are equal, and an spacing of the first quantity of subcarriers is not equal to an spacing of the second quantity of subcarriers.

With reference to the first possible implementation manner of the third aspect, in a third possible implementation manner of the third aspect, the first quantity being not equal to the second quantity includes:
a transmission bandwidth used by the first part of the transmission frame and a transmission bandwidth used by the second part of the transmission frame are not equal, and an spacing of the first quantity of subcarriers is equal to an spacing of the second quantity of subcarriers.

With reference to the first possible implementation manner of the third aspect, in a fourth possible implementation manner of the third aspect, the first quantity being not equal to the second quantity includes:
transmission bandwidths used by the first part of the transmission frame and the second part of the transmission frame are not equal, and an spacing of the first quantity of subcarriers is not equal to an spacing of the second quantity of subcarriers.

With reference to any one of the third aspect to the fourth possible implementation manner of the third aspect, in a fifth possible implementation manner of the third aspect, the first quantity being not equal to the second quantity is specifically:
the first quantity is less than the second quantity, and the spacing of the first quantity of subcarriers is 312.5 kHz.

With reference to any one of the third aspect to the fifth possible implementation manner of the third aspect, in a sixth possible implementation manner of the third aspect, the first part of the transmission frame includes a preamble part of the transmission frame, the second part of the transmission frame includes a data part of the transmission frame, and the preamble part of the transmission frame carries information required for the second communications device to demodulate the second part of the transmission frame.

With reference to the sixth possible implementation manner of the third aspect, in a seventh possible implementation manner of the third aspect, the preamble part of the transmission frame includes a legacy short training field L-STF, a legacy long training field L-LTF, legacy signaling L-SIG, and a high efficiency wireless local area network signaling HEW-SIG, where the HEW-SIG carries the information required for the second communications device to demodulate the second part of the transmission frame.

With reference to the seventh possible implementation manner of the third aspect, in an eighth possible implementation manner of the third aspect, the HEW-SIG carrying the information required for the second communications device to demodulate the second part of the transmission frame is specifically:

the HEW-SIG carries subcarrier quantity information used by the second part of the transmission frame and/or MCS information of the second part of the transmission frame.

With reference to the sixth possible implementation manner of the third aspect, in a ninth possible implementation manner of the third aspect, the preamble part of the transmission frame includes an L-STF, an L-LTF, and an L-SIG, where the L-SIG carries the information required for the second communications device to demodulate the second part of the transmission frame.

With reference to the ninth possible implementation manner of the third aspect, in a tenth possible implementation manner of the third aspect, the L-SIG carrying the information required for the second communications device to demodulate the second part of the transmission frame is specifically:

the L-SIG carries subcarrier quantity information used by the second part of the transmission frame and/or MCS information of the second part of the transmission frame.

With reference to any one of the third aspect to the tenth possible implementation manner of the third aspect, in an eleventh possible implementation manner of the third aspect, the data part of the transmission frame includes control information and the data information, where the control information includes at least one type of the following information: scheduling information, broadcast information, and system information.

With reference to the eleventh possible implementation manner of the third aspect, in a twelfth possible implementation manner of the third aspect, the communications device is a wireless access point AP, and the second communications device is at least one user station STA.

A fourth aspect of embodiments of the present invention provides a communications device, including:

a transceiver module, configured to receive a transmission frame sent by a first communications device, where the transmission frame includes a first part and a second part, the first part of the transmission frame is sent by the first communications device by using a first quantity of subcarriers, the second part of the transmission frame is sent by the first communications device by using a second quantity of subcarriers, the transceiver module receives the first part of the transmission frame by using Fourier transform of the first quantity, and the transceiver module receives the second part of the transmission frame by using Fourier transform of the second quantity; and further configured to: after an acquiring module acquires data information in the transmission frame, perform a next time of information transmission with the first communications device; and the acquiring module, configured to acquire the data information in the transmission frame.

With reference to the fourth aspect, in a first possible implementation manner of the fourth aspect, the communications device is a user station STA, and the first communications device is a wireless access point AP.

A fifth aspect of embodiments of the present invention provides a data transmission method, including:

sending, by a first communications device, a transmission frame to a second communications device, so that the second communications device acquires data information in the transmission frame, where the transmission frame includes a first part and a second part, the first communications device sends the first part of the transmission frame by using a first quantity of subcarriers, the first communications device sends the second part of the transmission frame by using a second quantity of subcarriers, and the first quantity is not equal to the second quantity; and performing, by the first communications device, a next time of information transmission with the second communications device.

With reference to the fifth aspect, in a first possible implementation manner of the fifth aspect, the performing, by the first communications device, a next time of information transmission with the second communications device specifically includes:

performing, by the first communications device, the next time of information transmission with the second communications device by using the second quantity of subcarriers.

With reference to the first possible implementation manner of the fifth aspect, in a second possible implementation manner of the fifth aspect, the first quantity being not equal to the second quantity includes:

transmission bandwidths used by the first part of the transmission frame and the second part of the transmission frame are equal, and an spacing of the first quantity of subcarriers is not equal to an spacing of the second quantity of subcarriers.

With reference to the first possible implementation manner of the fifth aspect, in a third possible implementation manner of the fifth aspect, the first quantity being not equal to the second quantity includes:

a transmission bandwidth used by the first part of the transmission frame and a transmission bandwidth used by the second part of the transmission frame are not equal, and an spacing of the first quantity of subcarriers is equal to an spacing of the second quantity of subcarriers.

With reference to the first possible implementation manner of the fifth aspect, in a fourth possible implementation manner of the fifth aspect, the first quantity being not equal to the second quantity includes:

transmission bandwidths used by the first part of the transmission frame and the second part of the transmission frame are not equal, and an spacing of the first quantity of subcarriers is not equal to an spacing of the second quantity of subcarriers.

With reference to any one of the fifth aspect to the fourth possible implementation manner of the fifth aspect, in a fifth possible implementation manner of the fifth aspect, the first quantity being not equal to the second quantity is specifically:

the first quantity is less than the second quantity, and the spacing of the first quantity of subcarriers is 312.5 kHz.

With reference to any one of the fifth aspect to the fifth possible implementation manner of the fifth aspect, in a sixth possible implementation manner of the fifth aspect, the first part of the transmission frame includes a preamble part of the transmission frame, the second part of the transmission frame includes a data part of the transmission frame, and the preamble part of the transmission frame carries information required for the second communications device to demodulate the second part of the transmission frame.

With reference to the sixth possible implementation manner of the fifth aspect, in a seventh possible implementation manner of the fifth aspect, the preamble part of the transmission frame includes a legacy short training field L-STF, a legacy long training field L-LTF, legacy signaling L-SIG, and a high efficiency wireless local area network signaling HEW-SIG, where the HEW-SIG carries the information required for the second communications device to demodulate the second part of the transmission frame.

With reference to the seventh possible implementation manner of the fifth aspect, in an eighth possible implementation manner of the fifth aspect, the HEW-SIG carrying the information required for the second communications device to demodulate the second part of the transmission frame is specifically:

the HEW-SIG carries subcarrier quantity information used by the second part of the transmission frame and/or MCS information of the second part of the transmission frame.

With reference to the sixth possible implementation manner of the fifth aspect, in a ninth possible implementation manner of the fifth aspect, the preamble part of the transmission frame includes an L-STF, an L-LTF, and an L-SIG, where the L-SIG carries the information required for the second communications device to demodulate the second part of the transmission frame.

With reference to the ninth possible implementation manner of the fifth aspect, in a tenth possible implementation manner of the fifth aspect, the L-SIG carries subcarrier quantity information used by the second part of the transmission frame and/or MCS information of the second part of the transmission frame.

With reference to any one of the fifth aspect to the tenth possible implementation manner of the fifth aspect, in an eleventh possible implementation manner of the fifth aspect, the data part of the transmission frame includes control information and the data information, where the control information includes at least one type of the following information: scheduling information, broadcast information, and system information.

With reference to the eleventh possible implementation manner of the fifth aspect, in a twelfth possible implementation manner of the fifth aspect, the first communications device is a wireless access point AP, and the second communications device is at least one user station STA.

A sixth aspect of embodiments of the present invention provides a data transmission method, including:

receiving, by a second communications device, a transmission frame sent by a first communications device, and acquiring data information in the transmission frame, where the transmission frame includes a first part and a second part, the first part of the transmission frame is sent by the first communications device by using a first quantity of subcarriers, the second part of the transmission frame is sent by the first communications device by using a second quantity of subcarriers, the second communications device receives the first part of the transmission frame by using Fourier transform of the first quantity, and the second communications device receives the second part of the transmission frame by using Fourier transform of the second quantity; and performing, by the second communications device, a next time of information transmission with the first communications device.

With reference to the sixth aspect, in a first possible implementation manner of the sixth aspect, the first communications device is a wireless access point AP, and the second communications device is a user station STA.

By means of the data transmission method and the communications device provided in the embodiments of the present invention, a transceiver sends a transmission frame including a first part and a second part to a second communications device, sends the first part by using a first quantity of subcarriers, and sends the second part by using a second quantity of subcarriers, where the first quantity is not equal to the second quantity; and after acquiring data information of the transmission frame, the second communications device performs a next time of information transmission with the foregoing transceiver. By means of the communications device provided in the embodiments of the present invention, the first part and the second part in the transmission frame are sent by using different quantities of subcarriers, that is, it is not limited that quantities of subcarriers used by the first part and the second part are equal, so that the communications device not only can effectively increase a throughput according to a requirement, but also can properly decrease a throughput according to a requirement, so that a change to a throughput of a communications system is not limited.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

FIG. 1 is a first schematic structural diagram of a transmission frame according to an embodiment of the present invention;

FIG. 2 is a second schematic structural diagram of a transmission frame according to an embodiment of the present invention;

FIG. 3 is a third schematic structural diagram of a transmission frame according to an embodiment of the present invention;

DESCRIPTION OF EMBODIMENTS

Figure 4:
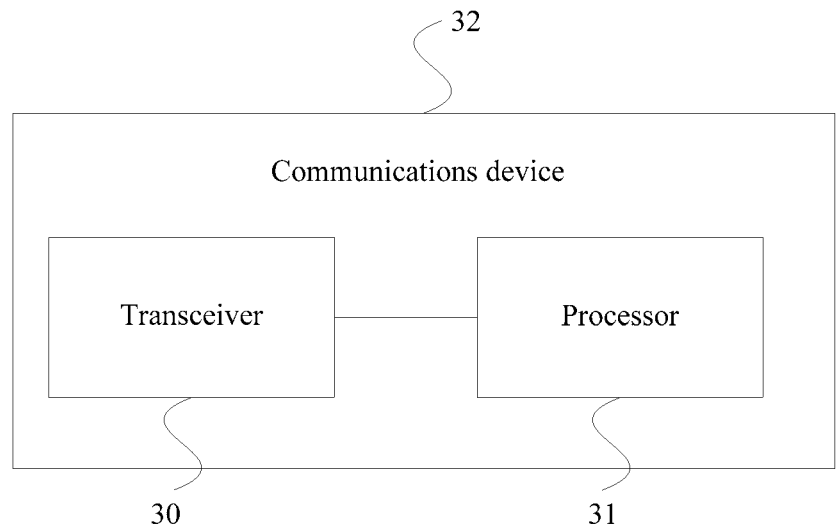
FIG. 4 is a schematic structural diagram of Embodiment 3 of a communications device according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Embodiments of the present invention may be applied to a next-generation Wi-Fi system (for example, a HEW system), or may be applied to another wireless local area network or cellular network. An example in which the embodiments of the present invention are applied to a HEW system is used for description.

Embodiment 1 of the present invention provides a communications device. The communications device includes: a transceiver, configured to send a transmission frame to a second communications device, so that the second communications device acquires data information in the transmission frame, where the transmission frame includes a first part and a second part, the foregoing transceiver sends the first part by using a first quantity of subcarriers, and sends the second part by using a second quantity of subcarriers, and the first quantity is not equal to the second quantity; and the foregoing transceiver, further configured to perform a next time of information transmission with the second communications device.

The second communications device in this embodiment of the present invention may be a user station (Station, STA for short hereinafter), or may be user equipment. The user equipment or user station may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (such as RAN, Radio Access Network). The wireless terminal may be a mobile terminal, such as a mobile phone (also referred to as a "cellular" phone), a computer with a mobile terminal, and a machine type communication (Machine Type Communication, MTC for short hereinafter) device, for example, may be a portable, pocket-sized, handheld, computer built-in, or in-vehicle mobile apparatus, which exchanges voices and/or data with the radio access network. For example, the wireless terminal may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile station (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

Specifically, the communications device in this embodiment of the present invention may be a base station, may be an AP, or may be a device that communicates with a wireless terminal over an air interface by using one or more sectors in an access network. After a base station of a HEW system has obtained a channel by means of contention, the transceiver sends the transmission frame to the second communications device, where the transmission frame may include the first part and the second part, where the transceiver sends the first part of the transmission frame by using the first quantity of subcarriers, and sends the second part of the transmission frame by using the second quantity of subcarriers. Optionally, the first quantity may be greater than the second quantity, or may be less than the second quantity, which is not limited in this embodiment of the present invention.

Reference may be made to FIG. 1 for a structure of the transmission frame and quantities of subcarriers used by the first part and the second part in the transmission frame. The transmission frame may be a normal transmission frame (frame), or may be a super frame (super frame). The first part of the transmission frame may simultaneously serve legacy user equipment (that is, a communications device in a non-HEW system mentioned in the following embodiments) and a communications device of a HEW system, or may serve only a communications device of a legacy non-HEW system, so that the communications device of the non-HEW system can listen and detect a part of content of the transmission frame, for example, information such as transmission duration of the transmission frame; the second part of the transmission frame may serve the communications device of the HEW system.

Moreover, optionally, an spacing of subcarriers of a bandwidth used by the first part of the transmission frame may be reduced to increase the quantity of the subcarriers used by the first part of the transmission frame, that is, to increase the first quantity; or an spacing of subcarriers of a bandwidth used by the second part of the transmission frame may be reduced to increase the quantity of the subcarriers used by the second part of the transmission frame, that is, the first quantity and the second quantity are not limited in this embodiment of the present invention, as long as the quantity of the subcarriers used by the first part of the transmission frame and the quantity of the subcarriers used by the second part of the transmission frame are not the same. That is, the quantities of the subcarriers used by the first part of the transmission frame and the second part of the transmission frame are not limited in this embodiment of the present invention. For example, when a system bandwidth is 20 MHz, the quantity of the subcarriers used by the first part of the transmission frame may be 64, and a subcarrier width is 20 MHz/64=312.5 kHz; the quantity of the subcarriers used by the second part of the transmission frame may be 512, may be 1024, or may be another quantity, so that the quantity of the subcarriers of the second part of the transmission frame is not limited to 64, thereby effectively increasing a throughput of a system, and further the increase in the throughput is not limited by a quantity of subcarriers; or the quantity of the subcarriers used by the first part of the transmission frame may be 512, and the quantity of the subcarriers used by the second part of the transmission frame may be 1024, so that the quantity is also not limited to 64, thereby also effectively increasing a throughput of a system, and further the increase in the throughput is not limited by a quantity of subcarriers (in the prior art, when a throughput of a system is increased, it is required to ensure that the quantity of the subcarriers used by the first part equals the quantity of the subcarriers used by the second part; therefore an increase in a throughput is not flexible enough, and an extent of the increase is also limited; it is not limited in the present invention that the quantities of the subcarriers used by the first part and the second part of the transmission frame are equal). Alternatively, when a system bandwidth is 40 MHz, the quantity of the subcarriers used by the first part of the transmission frame may be 128, and the quantity of the subcarriers used by the second part of the transmission frame may be 64, so that a system can reduce a throughput in some proper cases, and the reduction in the throughput is also not limited by a quantity of subcarriers; for example, when the system needs to coordinate with another device by using some delays, it is required to properly reduce the throughput of the system, so that a speed at which a device in the system demodulates the data information in the transmission frame is correspondingly reduced.

After receiving the transmission frame sent by the transceiver, the second communications device performs corresponding processing such as demodulation and decoding on the transmission frame, and acquires the data information in the transmission frame. Optionally, there may be one second communications device, or may be multiple second communications devices. Moreover, optionally, the second communications device may be a device of a HEW system, or may be a device of a non-HEW system. The device of the non-HEW system herein may be a communications device based on the IEEE 802.11a, 802.11g, 802.11n or 802.11ac standard, and any device of the non-HEW system mentioned in the following embodiments may be a communications device based on the IEEE 802.11a, 802.11g, 802.11n or 802.11ac standard. It should be noted that, if there are both a device of a HEW system and a device of a non-HEW system in a current HEW system, the device of the HEW system can demodulate the data information from the transmission frame, and although the device of the non-HEW system can receive the transmission frame, the device of the non-HEW system cannot acquire the data information in the transmission frame, and can only demodulate, from the first part of the frame, transmission duration of the frame (that is, the first part mentioned above may serve legacy user equipment) for setting a network allocation vector (Network Allocation Vector, for short NAV) of the device of the non-HEW system. It should be noted that, because different quantities of subcarriers are used by the first part and the second part, in a HEW system in which Orthogonal Frequency Division Multiplexing (Orthogonal Frequency Division Multiplexing, OFDM for short hereinafter) or Orthogonal Frequency Division Multiple Access (Orthogonal Frequency Division Multiple Access, OFDMA for short hereinafter) is applied, a quantity of Fourier transform points used when the second communications device receives the transmission frame is also different. In general cases, a quantity of Fourier transform points is equal to a quantity of subcarriers used during sending; for example, the quantity of the subcarriers used by the first part is NUM1, and the quantity of the subcarriers used by the second part is NUM2; therefore, Fourier transform of NUM1 points is used when the second communications device receives the first part, and Fourier transform of NUM2 points is used when the second communications device receives the second part.

After acquiring the data information in the transmission frame, the foregoing second communications device (the device of the HEW system) performs a next time of information transmission with the foregoing transceiver. It should be noted that, in this case, information transmitted by the transceiver with the second communications device may be control information, or may be pure data information, or may include both control information and the data information (that is, a first communications device still sends a complete transmission frame to the second communications device, and a transmission process of the transmission frame may also include two parts of transmission, where a quantity of subcarriers used in each part is different, and details are not described herein again); in addition, the information may also be separated by a small time space, for example, a short inter frame space (Short Inter Frame Space, SIFS for short hereinafter), and is then transmitted in another transmission frame; or a segment of information is first transmitted by using the second quantity of subcarriers, and after a small time space, information is then transmitted by using the second quantity of subcarriers, which is not limited in this embodiment of the present invention.

For the communications device provided in this embodiment of the present invention, a transceiver sends a transmission frame including a first part and a second part to a second communications device, sends the first part of the transmission frame by using a first quantity of subcarriers, and sends the second part of the transmission frame by using a second quantity of subcarriers, where the first quantity is not equal to the second quantity; and after acquiring data information of the transmission frame, the second communications device performs a next time of information transmission with the foregoing transceiver. By means of the communications device provided in this embodiment of the present invention, the first part and the second part in the transmission frame are sent by using different quantities of subcarriers, that is, it is not limited that quantities of subcarriers used by the first part and the second part are equal, so that the communications device not only can effectively increase a throughput according to a requirement, but also can properly decrease a throughput according to a requirement, so that a change to a throughput of a communications system is not limited.

Further, on the basis of Embodiment 1 above, the foregoing transceiver is specifically configured to perform the next time of information transmission with the second communications device by using the second quantity of subcarriers.

It should be noted that, when the transceiver performs the next time of information transmission with the second communications device by using the second quantity of subcarriers, the transceiver may send pure data information to the second communications device by using the second quantity of subcarriers, or the second communications device may send pure data information to the transceiver by using the second quantity of subcarriers.

On the basis of the foregoing embodiment, as a possible implementation manner of this embodiment of the present invention, this embodiment relates to an implementable manner of the foregoing first quantity being not equal to the second quantity, which is specifically: transmission bandwidths used by the first part of the foregoing transmission frame and the second part of the transmission frame are equal, and an spacing of the foregoing first quantity of subcarriers is not equal to an spacing of the second quantity of subcarriers.

Optionally, the spacing of the foregoing first quantity of subcarriers may be greater than the spacing of the second quantity of subcarriers, or may be less than the spacing of the second quantity of subcarriers. For example, when a system bandwidth is 20 MHz, a quantity of subcarriers used by the first part of the transmission frame is 64 (that is, the first quantity is 64), and a subcarrier width is 20M/64=312.5 kHz, where there are 48 data subcarriers, 4 pilot subcarriers, 1 direct current subcarrier, and the rest 11 subcarriers are used as a guard band interval; a quantity of subcarriers used by the second part of the transmission frame is 512 (that is, the second quantity is 512), and a subcarrier width is 20M/512=39.0625 kHz. Alternatively, when a system bandwidth is 20 MHz, a quantity of subcarriers used by the first part of the transmission frame is 64, and a quantity of subcarriers used by the second part of the transmission frame is 1024.

On the basis of Embodiment 1 above, as another possible implementation manner of this embodiment of the present invention, this embodiment relates to another implementable manner of the foregoing first quantity being not equal to the second quantity, which is specifically: a transmission bandwidth used by the first part of the foregoing transmission frame and a transmission bandwidth used by the second part of the transmission frame are not equal, and an spacing of the first quantity of subcarriers is equal to an spacing of the second quantity of subcarriers.

Optionally, the transmission bandwidth used by the first part of the foregoing transmission frame may be greater than the transmission bandwidth used by the second part of the transmission frame, or may be less than the transmission bandwidth used by the second part of the transmission frame. However, as in the example given in the Background, bandwidths used by a preamble part and a data part are essentially equal, and spacings of subcarriers are also equal, so that quantities of subcarriers of the two parts are equal. However, a change to a throughput of a system is limited. In this embodiment of the present invention, it is not limited that the bandwidths used by the first part of the transmission frame and the second part of the transmission frame are equal. For example, a transmission bandwidth used by the first part of the transmission frame may be 20 MHz, a transmission bandwidth used by the second part of the transmission frame may be 40 MHz, and an spacing of subcarriers may be 39.0625 kHz, that is, a quantity of subcarriers of the first part of the transmission frame is 512, and a quantity of subcarriers of the second part of the transmission frame is 1024, so that a quantity of subcarriers for transmitting the first part is not equal to a quantity of subcarriers for transmitting the second part.

On the basis of Embodiment 1 above, as a third possible implementation manner of this embodiment of the present invention, this embodiment relates to another implementable manner of the foregoing first quantity being not equal to the second quantity, which is specifically: transmission bandwidth used by the foregoing first part and second part are not equal, and an spacing of the first quantity of subcarriers is not equal to an spacing of the second quantity of subcarriers.

Optionally, there may be four cases in this embodiment, which are specifically:
  First: A transmission bandwidth used by the first part of the transmission frame is greater than a transmission bandwidth used by the second part of the transmission frame, and the spacing of the first quantity of subcarriers is greater than the spacing of the second quantity of subcarriers.
  Second: A transmission bandwidth used by the first part of the transmission frame is greater than a transmission bandwidth used by the second part of the transmission frame, and the spacing of the first quantity of subcarriers is less than the spacing of the second quantity of subcarriers.
  Third: A transmission bandwidth used by the first part of the transmission frame is less than a transmission bandwidth used by the second part of the transmission frame, and the spacing of the first quantity of subcarriers is greater than the spacing of the second quantity of subcarriers.
  Fourth: A transmission bandwidth used by the first part of the transmission frame is less than a transmission bandwidth used by the second part of the transmission frame, and the spacing of the first quantity of subcarriers is less than the spacing of the second quantity of subcarriers.

The third case is used as an example. It is assumed that a transmission bandwidth used by the first part of the transmission frame is 20 MHz, an spacing of subcarriers is 312.5 kHz, a transmission bandwidth used by the second part of the transmission frame is 40 MHz, and an spacing of subcarriers is 39.0625 kHz; therefore, a quantity of subcarriers used by the first part of the transmission frame is 64, and a quantity of subcarriers used by the second part of the transmission frame is 1024, so that the quantity of subcarriers for transmitting the first part is not equal to the quantity of subcarriers for transmitting the second part. That is, neither the bandwidths used for transmitting the first part and the second part of the transmission frame nor spacings of corresponding subcarriers are limited in this embodiment, so that the quantities of subcarriers used by the first part and the second part of the transmission frame are not equal (the first quantity is less than the second quantity), thereby effectively increasing a throughput of a system.

For the communications device provided in this embodiment of the present invention, a transceiver sends a transmission frame including a first part and a second part to a second communications device, sends the first part of the transmission frame by using a first quantity of subcarriers, and sends the second part of the transmission frame by using a second quantity of subcarriers, where the first quantity is not equal to the second quantity; and after acquiring data information of the transmission frame, the second communications device performs a next time of information transmission with the foregoing transceiver. By means of the communications device provided in this embodiment of the present invention, the first part and the second part in the transmission frame are sent by using different quantities of subcarriers, that is, it is not limited that quantities of subcarriers used by the first part of the transmission frame and the second part of the transmission frame are equal, so that the communications device not only can effectively increase a throughput according to a requirement, but also can properly decrease a throughput according to a requirement, so that a change to a throughput of a communications system is not limited.

Embodiment 2 of the present invention provides a communications device. Further, on the basis of the foregoing embodiment, this embodiment relates to an implementation manner in which the foregoing first quantity is less than the second quantity, and the spacing of the first quantity of subcarriers is 312.5 kHz.

Specifically, a bandwidth and an spacing of subcarriers of a system in the foregoing embodiment may be properly set, so that a quantity of subcarriers used by a first part of a transmission frame is less than a quantity of subcarriers used by a second part of the transmission frame; for example, bandwidths used by the first part and the second part of the transmission frame are equal, but an spacing of subcarriers of the first part of the transmission frame is greater than an spacing of subcarriers of the second part of the transmission frame. For example, when a system bandwidth is 20 MHz, the quantity of the subcarriers used by the first part of the transmission frame may be 64, and a subcarrier width is 20 MHz/64=312.5 kHz; the quantity of the subcarriers used by the second part of the transmission frame may be 512, may be 1024, or may be another quantity (as long as the quantity is not equal to the quantity of the subcarriers used by the first part), so that the quantity of the subcarriers of the second part of the transmission frame is not limited to 64, thereby effectively increasing a throughput of a system; or the quantity of the subcarriers used by the first part of the transmission frame may be 512, and the quantity of the subcarriers used by the second part of the transmission frame may be 1024, so that the quantity is also not limited to 64, thereby also increasing a throughput of a system, and the increase in the throughput of the system is not limited by a quantity of subcarriers.

Further, in the foregoing embodiment, a quantity of subcarriers used when a transceiver sends the first part of the transmission frame is less than a quantity of subcarriers used when the transceiver sends the second part of the transmission frame; to achieve backward compatibility, the transceiver sets the spacing of the first quantity of subcarriers to 312.5 kHz, that is, the transceiver uses a legacy spacing of subcarriers on a corresponding bandwidth to transmit the first part; in this way, a second communications device of a non-HEW system may be enabled to listen and detect the first part that is of the transmission frame and that is sent by the transceiver, so as to know duration of transmission of this transmission frame on a current channel, and not to occupy the current channel within the duration of transmission of the transmission frame, thereby achieving backward compatibility of a HEW system.

For the communications device provided in this embodiment of the present invention, a transceiver sends a transmission frame including a first part and a second part to a second communications device, sends the first part of the transmission frame by using a first quantity of subcarriers, and sends the second part of the transmission frame by using a second quantity of subcarriers, where the first quantity is less than the second quantity; and after acquiring data information of the transmission frame, the second communications device performs a next time of information transmission with the foregoing transceiver. By means of the communications device provided in this embodiment of the present invention, the first part and the second part in the transmission frame are sent by using different quantities of subcarriers, that is, it is not limited that quantities of subcarriers used by the first part and the second part are equal, so that a throughput of a communications system is effectively increased; further, an spacing of the first quantity of subcarriers is set to legacy 312.5 kHz, thereby achieving backward compatibility of the system.

Further, the first part of the foregoing transmission frame includes a preamble part of the transmission frame, and the second part of the transmission frame includes a data part of the transmission frame. In this embodiment of the present invention, the preamble part of the transmission frame carries information required for the second communications device to demodulate the second part of the transmission frame, so that the communications device provided in this embodiment of the present invention can desirably increase a throughput of a system and at the same time achieve backward compatibility. Optionally, there may be two implementation manners as follows:

First: The preamble part of the foregoing transmission frame includes an L-STF, an L-LTF, an L-SIG, and a high efficiency wireless local area network signaling (High Efficiency WLAN Signaling, HEW-SIG for short hereinafter), where the HEW-SIG carries the information required for the second communications device to demodulate the second part. Optionally, the information may be subcarrier quantity information used by the second part and/or modulation and coding scheme (Modulation and Coding Scheme, MCS for short hereinafter) information of the second part, or may be other information enabling the second part to demodulate the transmission frame. The data part included in the second part of the transmission frame may be control information and data information, where the control information includes at least one type of the following information: scheduling information, broadcast information, and system information.

Specifically, reference may be made to FIG. 2 for the structure of the transmission frame sent by the transceiver to the second communications device in this embodiment of the present invention. The preamble part of the foregoing transmission frame is used for transmitting preamble information and signaling information, where the preamble information includes an L-STF, an L-LTF, and an L-SIG, and is used for backward compatibility, and the L-STF, the L-LTF, and the L-SIG have same content as an L-STF, an L-LTF, and an L-SIG in a high throughput (High Throughput, HT for short hereinafter) system and a very high throughput (Very High Throughput, VHT for short hereinafter) system. The signaling information includes a HEW-SIG, where the HEW-SIG carries a quantity of subcarriers and/or a MCS manner that is used by the second part; and the HEW-SIG uses a phase rotation manner during modulation to detect a frame format of a second communications device of a HEW system, so that the second communications device of the HEW system can identify the transmission frame; for example, a modulation scheme QBPSK is used on a pilot subcarrier, or BPSK modulation of rotation of 45 degrees is used on a data subcarrier.

The control information included in the data part of the foregoing transmission frame may be at least one type of the following information: scheduling information, broadcast information, system information (for example, a navigation channel number, a primary channel number, and an index number of an available channel), so that the second communications device learns subcarriers on which the second communications device receives the foregoing transmission frame, and learns a quantity of Fourier transform points used when the first part and the second part are received, so as to accurately demodulate the data information in the transmission frame. Optionally, there may be no time space or there may be a very small time space between the control information and the data information of the second part.

Second: The preamble part of the transmission frame includes an L-STF, an L-LTF, and an L-SIG, where the L-SIG carries the information required for the second communications device to demodulate the second part. Optionally, the information may be subcarrier quantity information used by the second part and/or MCS information of the second part, or may be other information enabling the second part to demodulate the transmission frame.

Specifically, reference may be made to FIG. 3 for the structure of the transmission frame sent by the transceiver to the second communications device in this embodiment of the present invention. Different from FIG. 2, the first part does not include a HEW-SIG, and instead an improvement is made to an L-SIG; because an L-SIG has 4 bits, there may be 16 different combinations of expression; only 8 combinations of expression are used in the prior art, and in this embodiment, the rest eight expression manners are also used, so that the expression manners express different meanings in a HEW system. For example, the rest eight expression manners may be used to represent a MCS manner used in the second part. It should be noted that, when quantities of subcarriers used by the first part and the second part are different, the quantities of the subcarriers of the first part and the second part should be fixed, and the second communications device of the HEW system should be informed in advance of the quantities of the subcarriers of the first part and the second part, or the quantities of the subcarriers of the first part and the second part are specified in a standard.

Further, the communications device where the foregoing transceiver is located may be an AP, and the foregoing second communications device may be at least one STA.

For the communications device provided in this embodiment of the present invention, a transceiver sends a transmission frame including a first part and a second part to a second communications device, sends the first part of the transmission frame by using a first quantity of subcarriers, and sends the second part of the transmission frame by using a second quantity of subcarriers, where the first quantity is less than the second quantity; and after acquiring data information of the transmission frame, the second communications device performs a next time of information transmission with the foregoing transceiver. By means of the communications device provided in this embodiment of the present invention, the first part and the second part in the transmission frame are sent by using different quantities of subcarriers, that is, it is not limited that quantities of subcarriers used by the first part and the second part are equal, so that a throughput of a communications system is effectively increased; further, an spacing of the first quantity of subcarriers is set to legacy 312.5 kHz, thereby achieving backward compatibility of the system.

FIG. 4 is a schematic structural diagram of Embodiment 3 of a communications device according to the present invention. As shown in FIG. 4, the communications device 32 includes: a transceiver 30 and a processor 31. The transceiver 30 is configured to receive a transmission frame sent by a first communications device, where the transmission frame includes a first part and a second part, the first part of the transmission frame is sent by the first communications device by using a first quantity of subcarriers, the second part of the transmission frame is sent by the first communications device by using a second quantity of subcarriers, and the transceiver 30 receives the first part of the transmission frame by using Fourier transform of the first quantity, and receives the second part of the transmission frame by using Fourier transform of the second quantity. The transceiver 30 is further configured to: after the processor 31 acquires data information in the transmission frame, perform a next time of information transmission with the first communications device. The processor 31 is configured to acquire the data information in the transmission frame.

The communications device 32 where the transceiver 30 is located in this embodiment of the present invention may be a user station, or may be user equipment. The first communications device in this embodiment of the present invention may be a base station, may be an AP, or may be a device that communicates with a wireless terminal over an air interface by using one or more sectors in an access network.

After a base station of a HEW system has obtained a channel by means of contention, the first communications device sends the transmission frame to the foregoing transceiver 30, where the transmission frame may include the first part and the second part, where the first communications device sends the first part of the transmission frame by using the first quantity of subcarriers, and sends the second part of the transmission frame by using the second quantity of subcarriers. Optionally, the first quantity may be greater than the second quantity, or may be less than the second quantity, which is not limited in this embodiment of the present invention. Reference may be made to FIG. 1 and the related description for a structure of the transmission frame and quantities of subcarriers used by the first part and the second part in the transmission frame, and details are not described herein again.

Moreover, optionally, an spacing of subcarriers of a bandwidth used by the first part of the transmission frame may be reduced to increase the quantity of the subcarriers used by the first part of the transmission frame, that is, to increase the first quantity; or an spacing of subcarriers of a bandwidth used by the second part of the transmission frame may be reduced to increase the quantity of the subcarriers used by the second part of the transmission frame, that is, the first quantity and the second quantity are not limited in this embodiment of the present invention, as long as the quantity of the subcarriers used by the first part of the transmission frame and the quantity of the subcarriers used by the second part of the transmission frame are not the same. That is, the quantities of the subcarriers used by the first part of the transmission frame and the second part of the transmission frame are not limited in this embodiment of the present invention. For example, when a system bandwidth is 20 MHz, the quantity of the subcarriers used by the first part of the transmission frame may be 64, and a subcarrier width is 20 MHz/64=312.5 kHz; the quantity of the subcarriers used by the second part of the transmission frame may be 512, may be 1024, or may be another quantity (as long as the quantity is not equal to the quantity of the subcarriers used by the first part), so that the quantity of the subcarriers of the second part of the transmission frame is not limited to 64, thereby effectively increasing a throughput of a system, and further the increase in the throughput is not limited by a quantity of subcarriers (in the prior art, when a throughput of a system is increased, it is required to ensure that the quantity of the subcarriers used by the first part equals the quantity of the subcarriers used by the second part; therefore an increase in a throughput is not flexible enough, and an extent of the increase is also limited; it is not limited in the present invention that the quantities of the subcarriers used by the first part and the second part of the transmission frame are equal); or the quantity of the subcarriers used by the first part of the transmission frame may be 512, and the quantity of the subcarriers used by the second part of the transmission frame may be 1024, so that the quantity is also not limited to 64, thereby increasing a throughput of a system, and further the increase in the throughput is not limited by a quantity of subcarriers. Alternatively, when a system bandwidth is 40 MHz, the quantity of the subcarriers used by the first part of the transmission frame may be 128, and the quantity of the subcarriers used by the second part of the transmission frame may be 64, so that a system can reduce a throughput in some proper cases, and the reduction in the throughput is also not limited by a quantity of subcarriers; for example, when the system needs to coordinate with another device by using some delays, it is required to properly reduce the throughput of the system, so that a speed at which a device in the system demodulates the data information in the transmission frame is correspondingly reduced.

The transceiver 30 receives the transmission frame sent by the first communications device, where a quantity of Fourier transform points used when the transceiver 30 receives the first part of the transmission frame is the first quantity, and a quantity of Fourier transform points used when the transceiver 30 receives the second part in the transmission frame is the second quantity. That is, because different quantities of subcarriers are used by the first part and the second part, in a HEW system in which OFDM or OFDMA is applied, a quantity of Fourier transform points used when the transceiver 30 receives the transmission frame is also different. In general cases, a quantity of Fourier transform points is equal to a quantity of subcarriers used during sending; for example, the quantity of the subcarriers used by the first part is NUM1, and the quantity of the subcarriers used by the second part is NUM2; therefore, Fourier transform of NUM1 points is used when the transceiver 30 receives the first part, and Fourier transform of NUM2 points is used when the transceiver 30 receives the second part.

After the transceiver 30 receives the foregoing first part and second part, the processor 31 performs corresponding processing such as demodulation and decoding on the transmission frame, and acquires the data information in the transmission frame. Subsequently, the transceiver 30 performs a next time of information transmission with the foregoing first communications device. It should be noted that, in this case, information transmitted by the transceiver 30 with the first communications device may be control information, may be pure data information, or may include both control information and the data information; in addition, the information may also be separated by a small time space, for example, a SIFS, and is then transmitted in another transmission frame; or a segment of information is first transmitted by using the second quantity of subcarriers, and after a small time space, information is then transmitted by using the second quantity of subcarriers, which is not limited in this embodiment of the present invention.

Further, the communications device 32 in this embodiment of the present invention is a STA, and the first communications device is an AP.

For the communications device provided in this embodiment of the present invention, a transceiver receives a transmission frame that is sent by a first communications device and that includes a first part and a second part, where the first communications device sends the first part of the transmission frame by using a first quantity of subcarriers, and sends the second part of the transmission frame by using a second quantity of subcarriers, the first quantity is not equal to the second quantity, a quantity of Fourier transform points used when the transceiver receives the first part of the transmission frame is the first quantity, and a quantity of Fourier transform points used when the transceiver receives the second part of the transmission frame is the second quantity; and subsequently, a processor acquires data information in the transmission frame, and the transceiver performs a next time of information transmission with the first communications device. For the communications device provided in this embodiment of the present invention, the first part and the second part in the transmission frame that are sent by the first communications device by using different quantities of subcarriers are received, that is, it is not limited that quantities of subcarriers used by the first part and the second part are equal, so that the communications device not only can effectively increase a throughput according to a requirement, but also can properly decrease a throughput according to a requirement, so that a change to a throughput of a communications system is not limited.

Embodiment 4 of the present invention provides a communications device. The communications device includes: a transceiver module, configured to send a transmission frame to a second communications device, so that the second communications device acquires data information in the transmission frame, where the transmission frame includes a first part and a second part, the transceiver module sends the first part of the transmission frame by using a first quantity of subcarriers, and sends the second part of the transmission frame by using a second quantity of subcarriers, and the first quantity is not equal to the second quantity; and the transceiver module, further configured to perform data transmission with the second communications device by using the second quantity of subcarriers.

The second communications device involved in this embodiment of the present invention may be a user station, or may be user equipment. The communications device involved in this embodiment of the present invention may be a base station, may be an AP, or may be a device that communicates with a wireless terminal over an air interface by using one or more sectors in an access network. The transceiver module in this embodiment of the present invention may be integrated in a communications device.

After a base station of a HEW system has obtained a channel by means of contention, the transceiver module sends the transmission frame to the second communications device, where the transmission frame may include the first part and the second part, where the transceiver module sends the first part of the transmission frame by using the first quantity of subcarriers, and sends the second part of the transmission frame by using the second quantity of subcarriers. Optionally, the first quantity may be greater than the second quantity, or may be less than the second quantity, which is not limited in this embodiment of the present invention.

Reference may be made to FIG. 1 for a structure of the transmission frame and quantities of subcarriers used by the first part and the second part in the transmission frame. The transmission frame may be a normal transmission frame (frame), or may be a super frame (super frame). The first part of the transmission frame may simultaneously serve legacy user equipment (that is, a communications device in a non-HEW system mentioned in the following embodiments) and a communications device of a HEW system, or may serve only a communications device of a legacy non-HEW system, so that the communications device of the non-HEW system can listen and detect a part of content of the transmission frame, for example, information such as transmission duration of the transmission frame; the second part of the transmission frame may serve the communications device of the HEW system.

Moreover, optionally, an spacing of subcarriers of a bandwidth used by the first part of the transmission frame may be reduced to increase the quantity of the subcarriers used by the first part of the transmission frame, that is, to increase the first quantity; or an spacing of subcarriers of a bandwidth used by the second part of the transmission frame may be reduced to increase the quantity of the subcarriers used by the second part of the transmission frame, that is, the first quantity and the second quantity are not limited in this embodiment of the present invention, as long as the quantity of the subcarriers used by the first part of the transmission frame and the quantity of the subcarriers used by the second part of the transmission frame are not the same. That is, the quantities of the subcarriers used by the first part of the transmission frame and the second part of the transmission frame are not limited in this embodiment of the present invention. For example, when a system bandwidth is 20 MHz, the quantity of the subcarriers used by the first part of the transmission frame may be 64, and a subcarrier width is 20 MHz/64=312.5 kHz; the quantity of the subcarriers used by the second part of the transmission frame may be 512, may be 1024, or may be another quantity (as long as the quantity is not equal to the quantity of the subcarriers used by the first part), so that the quantity of the subcarriers of the second part of the transmission frame is not limited to 64, thereby effectively increasing a throughput of a system, and further the increase in the throughput is not limited by a quantity of subcarriers; or the quantity of the subcarriers used by the first part of the transmission frame may be 512, and the quantity of the subcarriers used by the second part of the transmission frame may be 1024, so that the quantity is also not limited to 64, thereby increasing a throughput of a system, and further the increase in the throughput is not limited by a quantity of subcarriers (in the prior art, when a throughput of a system is increased, it is required to ensure that the quantity of the subcarriers used by the first part equals the quantity of the subcarriers used by the second part; therefore an increase in a throughput is not flexible enough, and an extent of the increase is also limited; it is not limited in the present invention that the quantities of the subcarriers used by the first part and the second part of the transmission frame are equal). Alternatively, when a system bandwidth is 40 MHz, the quantity of the subcarriers used by the first part of the transmission frame may be 128, and the quantity of the subcarriers used by the second part of the transmission frame may be 64, so that a system can reduce a throughput in some proper cases, and the reduction in the throughput is also not limited by a quantity of subcarriers; for example, when the system needs to coordinate with another device by using some delays, it is required to properly reduce the throughput of the system, so that a speed at which a device in the system demodulates the data information in the transmission frame is correspondingly reduced.

After receiving the transmission frame sent by the transceiver module, the second communications device performs corresponding processing such as demodulation and decoding on the transmission frame, and acquires the data information in the transmission frame. Optionally, there may be one second communications device, or may be multiple second communications devices. Moreover, optionally, the second communications device may be a device of a HEW system, or may be a device of a non-HEW system. It should be noted that, if there are both a device of a HEW system and a device of a non-HEW system in a current HEW system, the device of the HEW system can demodulate the data information from the transmission frame, and although the device of the non-HEW system can receive the transmission frame, the device of the non-HEW system cannot acquire the data information in the transmission frame, and can only demodulate, from the first part of the frame, transmission duration of the frame for setting a NAV of the device of the non-HEW system. It should be noted that, because different quantities of subcarriers are used by the first part and the second part, in a HEW system in which OFDM or OFDMA is applied, a quantity of Fourier transform points used when the second communications device receives the transmission frame is also different. In general cases, a quantity of Fourier transform points is equal to a quantity of subcarriers used during sending; for example, the quantity of the subcarriers used by the first part is NUM1, and the quantity of the subcarriers used by the second part is NUM2; therefore, Fourier transform of NUM1 points is used when the second communications device receives the first part, and Fourier transform of NUM2 points is used when the second communications device receives the second part.

After acquiring the data information in the transmission frame, the foregoing second communications device (the device of the HEW system) performs a next time of information transmission with the foregoing transceiver module. It should be noted that, in this case, information transmitted by the transceiver module with the second communications device may be control information, may be pure data information, or may include both control information and the data information; in addition, the information may also be separated by a small time space, for example, a SIFS, and is then transmitted in another transmission frame; or a segment of information is first transmitted by using the second quantity of subcarriers, and after a small time space, information is then transmitted by using the second quantity of subcarriers, which is not limited in this embodiment of the present invention.

For the communications device provided in this embodiment of the present invention, a transceiver module sends a transmission frame including a first part and a second part to a second communications device, sends the first part of the transmission frame by using a first quantity of subcarriers, and sends the second part of the transmission frame by using a second quantity of subcarriers, where the first quantity is not equal to the second quantity; and after acquiring data information of the transmission frame, the second communications device performs a next time of information transmission with the foregoing transceiver module. By means of the communications device provided in this embodiment of the present invention, the first part and the second part in the transmission frame are sent by using different quantities of subcarriers, that is, it is not limited that quantities of subcarriers used by the first part and the second part are equal, so that the communications device not only can effectively increase a throughput according to a requirement, but also can properly decrease a throughput according to a requirement, so that a change to a throughput of a communications system is not limited.

Further, on the basis of Embodiment 4 above, the foregoing transceiver module is specifically configured to perform the next time of information transmission with the second communications device by using the second quantity of subcarriers.

It should be noted that, when the transceiver module performs the next time of information transmission with the second communications device by using the second quantity of subcarriers, the transceiver module may send pure data information to the second communications device by using the second quantity of subcarriers, or the second communications device may send pure data information to the transceiver module by using the second quantity of subcarriers.

On the basis of Embodiment 4 above, as a possible implementation manner of this embodiment of the present invention, this embodiment relates to an implementable manner of the foregoing first quantity being not equal to the second quantity, which is specifically: transmission bandwidths used by the first part of the foregoing transmission frame and the second part of the transmission frame are equal, and an spacing of the foregoing first quantity of subcarriers is not equal to an spacing of the second quantity of subcarriers.

On the basis of Embodiment 1 above, as another possible implementation manner of this embodiment of the present invention, this embodiment relates to another implementable manner of the foregoing first quantity being not equal to the second quantity, which is specifically: a transmission bandwidth used by the first part of the foregoing transmission frame and a transmission bandwidth used by the second part of the transmission frame are not equal, and an spacing of the first quantity of subcarriers is equal to an spacing of the second quantity of subcarriers.

On the basis of Embodiment 1 above, as a third possible implementation manner of this embodiment of the present invention, this embodiment relates to another implementable manner of the foregoing first quantity being not equal to the second quantity, which is specifically: transmission bandwidths used by the first part of the foregoing transmission frame and the second part of the transmission frame are not equal, and an spacing of the first quantity of subcarriers is not equal to an spacing of the second quantity of subcarriers.

Specifically, for the foregoing three possible implementation manners of the first quantity being not equal to the second quantity, reference may be made to the description of Embodiment 1 to Embodiment 3 above, and details are not described herein again.

For the communications device provided in this embodiment of the present invention, a transceiver module sends a transmission frame including a first part and a second part to a second communications device, sends the first part of the transmission frame by using a first quantity of subcarriers, and sends the second part of the transmission frame by using a second quantity of subcarriers, where the first quantity is not equal to the second quantity; and after acquiring data information of the transmission frame, the second communications device performs a next time of information transmission with the foregoing transceiver module. By means of the communications device provided in this embodiment of the present invention, the first part and the second part in the transmission frame are sent by using different quantities of subcarriers, that is, it is not limited that quantities of subcarriers used by the first part of the transmission frame and the second part of the transmission frame are equal, so that the communications device not only can effectively increase a throughput according to a requirement, but also can properly decrease a throughput according to a requirement, so that a change to a throughput of a communications system is not limited.

Embodiment 5 of the present invention provides a communications device. Further, on the basis of the foregoing embodiment, this embodiment relates to an implementation manner in which the foregoing first quantity is less than the second quantity, and the spacing of the first quantity of subcarriers is 312.5 kHz.

Specifically, a bandwidth and an spacing of subcarriers of a system in the foregoing embodiment may be properly set, so that a quantity of subcarriers used by a first part of a transmission frame is less than a quantity of subcarriers used by a second part of the transmission frame; for example, bandwidths used by the first part of the transmission frame and the second part of the transmission frame are equal, but an spacing of subcarriers of the first part of the transmission frame is greater than an spacing of subcarriers of the second part of the transmission frame. For example, when a system bandwidth is 20 MHz, the quantity of the subcarriers used by the first part of the transmission frame may be 64, and a subcarrier width is 20 MHz/64=312.5 kHz; the quantity of the subcarriers used by the second part of the transmission frame may be 512, may be 1024, or may be another quantity (as long as the quantity is not equal to the quantity of the subcarriers used by the first part), so that the quantity of the subcarriers of the second part is not limited to 64, thereby effectively increasing a throughput of a system; or the quantity of subcarriers used by the first part of the transmission frame may be 512, and the quantity of the subcarriers used by the second part of the transmission frame may be 1024, so that the quantity is also not limited to 64, thereby also increasing a throughput of a system, and the increase in the throughput of the system is not limited by a quantity of subcarriers.

Further, in the foregoing embodiment, a quantity of subcarriers used when the transceiver module sends the first part of the transmission frame is less than a quantity of subcarriers used when the transceiver module sends the second part of the transmission frame. To achieve backward compatibility, the transceiver module sets the spacing of the first quantity of subcarriers to 312.5 kHz, that is, the transceiver module uses a legacy spacing of subcarriers on a corresponding bandwidth to transmit the first part; in this way, a second communications device based on the IEEE 802.11a, 802.11g, 802.11n or 802.11ac standard is also enabled to listen and detect the first part that is of the transmission frame and that is sent by the transceiver module, so as to know duration of transmission of this transmission frame on a current channel, and not to occupy the current channel within the duration of transmission of the transmission frame, thereby achieving backward compatibility of a HEW system.

For the communications device provided in this embodiment of the present invention, a transceiver module sends a transmission frame including a first part and a second part to a second communications device, sends the first part of the transmission frame by using a first quantity of subcarriers, and sends the second part of the transmission frame by using a second quantity of subcarriers, where the first quantity is less than the second quantity; and after acquiring data information of the transmission frame, the second communications device performs a next time of information transmission with the foregoing transceiver module. By means of the communications device provided in this embodiment of the present invention, the first part and the second part in the transmission frame are sent by using different quantities of subcarriers, that is, it is not limited that quantities of subcarriers used by the first part and the second part are equal, so that a throughput of a communications system is effectively increased; further, an spacing of the first quantity of subcarriers is set to legacy 312.5 kHz, thereby achieving backward compatibility of the system.

Further, the first part of the foregoing transmission frame includes a preamble part of the transmission frame, and the second part of the transmission frame includes a data part of the transmission frame. In this embodiment of the present invention, the preamble part of the transmission frame carries information required for the second communications device to demodulate the second part of the transmission frame, so that the communications device in this embodiment of the present invention can desirably increase a throughput of a system and at the same time achieve backward compatibility. Optionally, there may be two implementation manners as follows:

First: The preamble part of the foregoing transmission frame includes an L-STF, an L-LTF, an L-SIG, and a HEW-SIG, where the HEW-SIG carries the information required for the second communications device to demodulate the second part. Optionally, the information may be subcarrier quantity information used by the second part and/or MCS information of the second part, or may be other information enabling the second part to demodulate the transmission frame. The data part included in the second part of the transmission frame may include control information and the data information, where the control information includes at least one type of the following information: scheduling information, broadcast information, and system information.

Specifically, reference may be made to FIG. 2 and the related description for a structure of the transmission frame sent by the transceiver module to the second communications device in this embodiment of the present invention, and details are not described herein again.

Second: The preamble part of the foregoing transmission frame includes an L-STF, an L-LTF, and an L-SIG, where the L-SIG carries the information required for the second communications device to demodulate the second part. Optionally, the information may be subcarrier quantity information used by the second part and/or MCS information of the second part, or may be other information enabling the second part to demodulate the transmission frame.

Specifically, reference may be made to FIG. 3 and the related description for a structure of the transmission frame sent by the transceiver module to the second communications device in this embodiment of the present invention, and details are not described herein again.

Further, the foregoing communications device may be an AP, and the foregoing second communications device may be at least one STA.

For the communications device provided in this embodiment of the present invention, a transceiver module sends a transmission frame including a first part and a second part to a second communications device, sends the first part of the transmission frame by using a first quantity of subcarriers, and sends the second part of the transmission frame by using a second quantity of subcarriers, where the first quantity is less than the second quantity; and after acquiring data information of the transmission frame, the second communications device performs a next time of information transmission with the foregoing transceiver module. By means of the communications device provided in this embodiment of the present invention, the first part and the second part in the transmission frame are sent by using different quantities of subcarriers, that is, it is not limited that quantities of subcarriers used by the first part and the second part are equal, so that a throughput of a communications system is effectively increased; further, an spacing of the first quantity of subcarriers is set to legacy 312.5 kHz, thereby achieving backward compatibility of the system.

Figure 5:
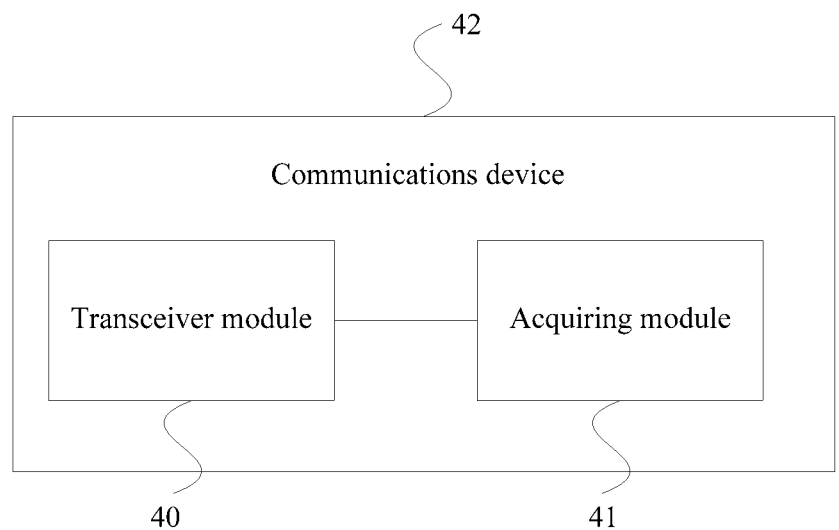
FIG. 5 is a schematic structural diagram of Embodiment 6 of a communications device according to the present invention.

FIG. 5 is a schematic structural diagram of Embodiment 6 of a communications device according to the present invention. As shown in FIG. 5, the communications device 42 includes: a transceiver module 40 and an acquiring module 41. The transceiver module 40 is configured to receive a transmission frame sent by a first communications device, where the transmission frame includes a first part and a second part, the first part of the transmission frame is sent by the first communications device by using a first quantity of subcarriers, the second part of the transmission frame is sent by the first communications device by using a second quantity of subcarriers, and the transceiver module 40 receives the first part of the transmission frame by using Fourier transform of the first quantity, and receives the second part of the transmission frame by using Fourier transform of the second quantity. The transceiver module 40 is further configured to: after the acquiring module 41 acquires data information in the transmission frame, perform a next time of information transmission with the first communications device. The acquiring module 41 is configured to acquire the data information in the transmission frame.

The communications device 42 where the transceiver module 40 is located in this embodiment of the present invention may be a user station, or may be user equipment. The first communications device involved in this embodiment of the present invention may be a base station, may be an AP, or may be a device that communicates with a wireless terminal over an air interface by using one or more sectors in an access network.

After a base station of a HEW system has obtained a channel by means of contention, the first communications device sends the transmission frame to the foregoing transceiver module 40, where the transmission frame may include the first part and the second part, where the first communications device sends the first part of the transmission frame by using the first quantity of subcarriers, and sends the second part of the transmission frame by using the second quantity of subcarriers. Optionally, the first quantity may be greater than the second quantity, or may be less than the second quantity, which is not limited in this embodiment of the present invention. Reference may be made to FIG. 1 and the related description for a structure of the transmission frame and quantities of subcarriers used by the first part and the second part in the transmission frame, and details are not described herein again.

Moreover, optionally, an spacing of subcarriers of a bandwidth used by the first part of the transmission frame may be reduced to increase the quantity of the subcarriers used by the first part of the transmission frame, that is, to increase the first quantity; or an spacing of subcarriers of a bandwidth used by the second part of the transmission frame may be reduced to increase the quantity of the subcarriers used by the second part of the transmission frame, that is, the first quantity and the second quantity are not limited in this embodiment of the present invention, as long as the quantity of the subcarriers used by the first part of the transmission frame and the quantity of the subcarriers used by the second part of the transmission frame are not the same. That is, the quantities of the subcarriers used by the first part and the second part are not limited in this embodiment of the present invention. For example, when a system bandwidth is 20 MHz, the quantity of the subcarriers used by the first part of the transmission frame may be 64, and a subcarrier width is 20 MHz/64=312.5 kHz; the quantity of the subcarriers used by the second part of the transmission frame may be 512, may be 1024, or may be another quantity (as long as the quantity is not equal to the quantity of the subcarriers used by the first part), so that the quantity of the subcarriers of the second part of the transmission frame is not limited to 64, thereby effectively increasing a throughput of a system, and further the increase in the throughput is not limited by a quantity of subcarriers (in the prior art, when a throughput of a system is increased, it is required to ensure that the quantity of the subcarriers used by the first part equals the quantity of the subcarriers used by the second part; therefore an increase in a throughput is not flexible enough, and an extent of the increase is also limited; it is not limited in the present invention that the quantities of the subcarriers used by the first part and the second part of the transmission frame are equal); or the quantity of the subcarriers used by the first part of the transmission frame may be 512, and the quantity of the subcarriers used by the second part of the transmission frame may be 1024, so that the quantity is also not limited to 64, thereby increasing a throughput of a system, and further the increase in the throughput is not limited by a quantity of subcarriers. Alternatively, when a system bandwidth is 40 MHz, the quantity of the subcarriers used by the first part of the transmission frame may be 128, and the quantity of the subcarriers used by the second part of the transmission frame may be 64, so that a system can reduce a throughput in some proper cases, and the reduction in the throughput is also not limited by a quantity of subcarriers; for example, when the system needs to coordinate with another device by using some delays, it is required to properly reduce the throughput of the system, so that a speed at which a device in the system demodulates the data information in the transmission frame is correspondingly reduced.

The transceiver module 40 receives the transmission frame sent by the first communications device, where a quantity of Fourier transform points used when the transceiver module 40 receives the first part of the transmission frame is the first quantity, and a quantity of Fourier transform points used when the transceiver module 40 receives the second part in the transmission frame is the second quantity. That is, because different quantities of subcarriers are used by the first part and the second part, in a HEW system in which OFDM or OFDMA is applied, a quantity of Fourier transform points used when the transceiver module 40 receives the transmission frame is also different. In general cases, a quantity of Fourier transform points is equal to a quantity of subcarriers used during sending; for example, the quantity of the subcarriers used by the first part is NUM1, and the quantity of the subcarriers used by the second part is NUM2; therefore, Fourier transform of NUM1 points is used when the transceiver module 40 receives the first part, and Fourier transform of NUM2 points is used when the transceiver module 40 receives the second part.

After the transceiver module 40 receives the foregoing first part and second part, the acquiring module 41 performs corresponding processing such as demodulation and decoding on the transmission frame, and acquires the data information in the transmission frame. Subsequently, the transceiver module 40 performs a next time of information transmission with the foregoing first communications device. It should be noted that, in this case, information transmitted by the transceiver module 40 with the first communications device by using the second quantity of subcarriers may be control information, may be pure data information, or may include both control information and the data information; in addition, the information may also be separated by a small time space, for example, a SIFS, and is then transmitted in another transmission frame; or a segment of information is first transmitted by using the second quantity of subcarriers, and after a small time space, information is then transmitted by using the second quantity of subcarriers, which is not limited in this embodiment of the present invention.

Further, the communications device 42 in this embodiment of the present invention is a STA, and the first communications device is an AP.

For the communications device provided in this embodiment of the present invention, a transceiver module receives a transmission frame that is sent by a first communications device and that includes a first part and a second part, where the first communications device sends the first part of the transmission frame by using a first quantity of subcarriers, and sends the second part of the transmission frame by using a second quantity of subcarriers, the first quantity is not equal to the second quantity, a quantity of Fourier transform points used when the transceiver module receives the first part is the first quantity, and a quantity of Fourier transform points used when the transceiver module receives the second part is the second quantity; and subsequently, an acquiring module acquires data information in the transmission frame, and the transceiver module performs a next time of information transmission with the first communications device. For the communications device provided in this embodiment of the present invention, the first part and the second part in the transmission frame that are sent by the first communications device by using different quantities of subcarriers are received, that is, it is not limited that quantities of subcarriers used by the first part and the second part are equal, so that the communications device not only can effectively increase a throughput according to a requirement, but also can properly decrease a throughput according to a requirement, so that a change to a throughput of a communications system is not limited.

Figure 6:
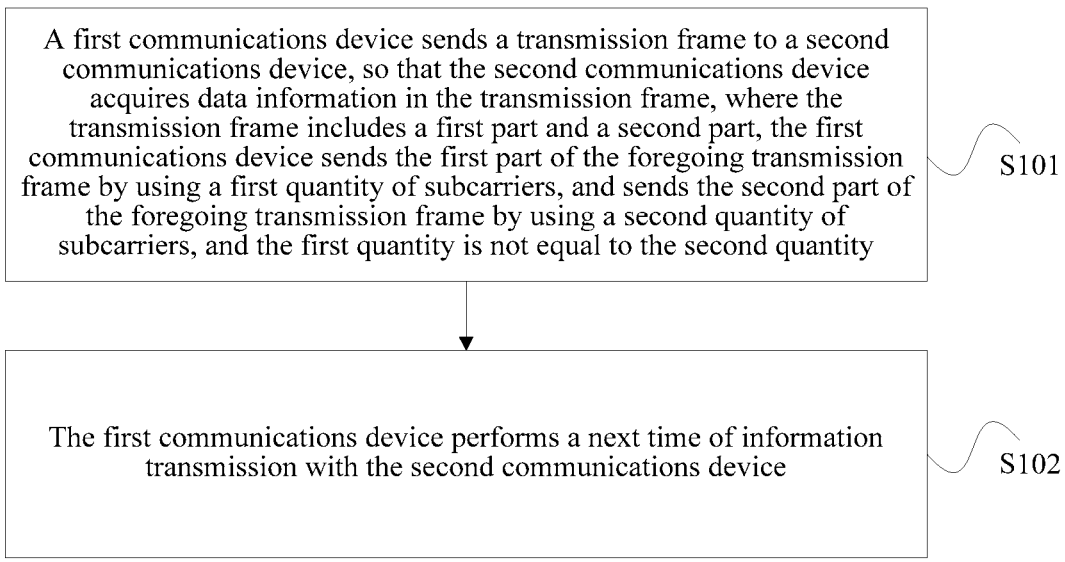
FIG. 6 is a schematic flowchart of Embodiment 1 of a data transmission method according to the present invention.

FIG. 6 is a schematic flowchart of Embodiment 1 of a data transmission method according to the present invention. The method is executed by a first communications device, where the first communications device may be the communications device in Apparatus Embodiment 1, Embodiment 2, Embodiment 4, and Embodiment 5 above. As shown in FIG. 6, the method includes:

S101: A first communications device sends a transmission frame to a second communications device, so that the second communications device acquires data information in the transmission frame, where the transmission frame includes a first part and a second part, the first communications device sends the first part of the foregoing transmission frame by using a first quantity of subcarriers, and sends the second part of the foregoing transmission frame by using a second quantity of subcarriers, and the first quantity is not equal to the second quantity.

S102: The first communications device performs a next time of information transmission with the second communications device.

For the data transmission method provided in this embodiment of the present invention, reference may be made to an execution process of the communications device in the foregoing embodiments; an implementation principle and a technical effect of the data transmission method are similar, and details are not described herein again.

Further, the first communications device performs the next time of information transmission with the second communications device by using the second quantity of subcarriers.

Optionally, the foregoing first quantity being not equal to the second quantity may be: transmission bandwidths used by the first part of the transmission frame and the second part of the transmission frame are equal, and an spacing of the first quantity of subcarriers is not equal to an spacing of the second quantity of subcarriers.

Optionally, the foregoing first quantity being not equal to the second quantity may further be: a transmission bandwidth used by the first part of the transmission frame and a transmission bandwidth used by the second part of the transmission frame are not equal, and an spacing of the first quantity of subcarriers is equal to an spacing of the second quantity of subcarriers.

Optionally, the foregoing first quantity being not equal to the second quantity may also be: transmission bandwidths used by the first part of the transmission frame and the second part of the transmission frame are not equal, and an spacing of the first quantity of subcarriers is not equal to an spacing of the second quantity of subcarriers.

For the data transmission method provided in this embodiment of the present invention, reference may be made to an execution process of the communications device in the foregoing embodiments; an implementation principle and a technical effect of the data transmission method are similar, and details are not described herein again.

Further, the foregoing first quantity being not equal to the second quantity is specifically: the first quantity is less than the second quantity, and the spacing of the first quantity of subcarriers is 312.5 kHz.

Further, the first part of the foregoing transmission frame includes a preamble part of the transmission frame, the second part of the transmission frame includes a data part of the transmission frame, and the preamble part of the transmission frame carries information required for the second communications device to demodulate the second part.

Optionally, the preamble part of the foregoing transmission frame includes a legacy short training field L-STF, a legacy long training field L-LTF, legacy signaling L-SIG, and a high efficiency wireless local area network signaling HEW-SIG, where the HEW-SIG carries the information required for the second communications device to demodulate the second part.

Optionally, the HEW-SIG carries subcarrier quantity information used by the second part and/or MCS information of the second part.

Optionally, the preamble part of the foregoing transmission frame includes an L-STF, an L-LTF, and an L-SIG, where the L-SIG carries the information required for the second communications device to demodulate the second part.

Optionally, the L-SIG carries subcarrier quantity information used by the second part and/or MCS information of the second part.

Optionally, the data part of the foregoing transmission frame includes control information and the data information, where the control information includes at least one type of the following information: scheduling information, broadcast information, and system information.

Optionally, the foregoing first communications device is a wireless access point AP, and the foregoing second communications device is at least one user station STA.

For the data transmission method provided in this embodiment of the present invention, reference may be made to an execution process of the communications device in the foregoing embodiments; an implementation principle and a technical effect of the data transmission method are similar, and details are not described herein again.

Figure 7:
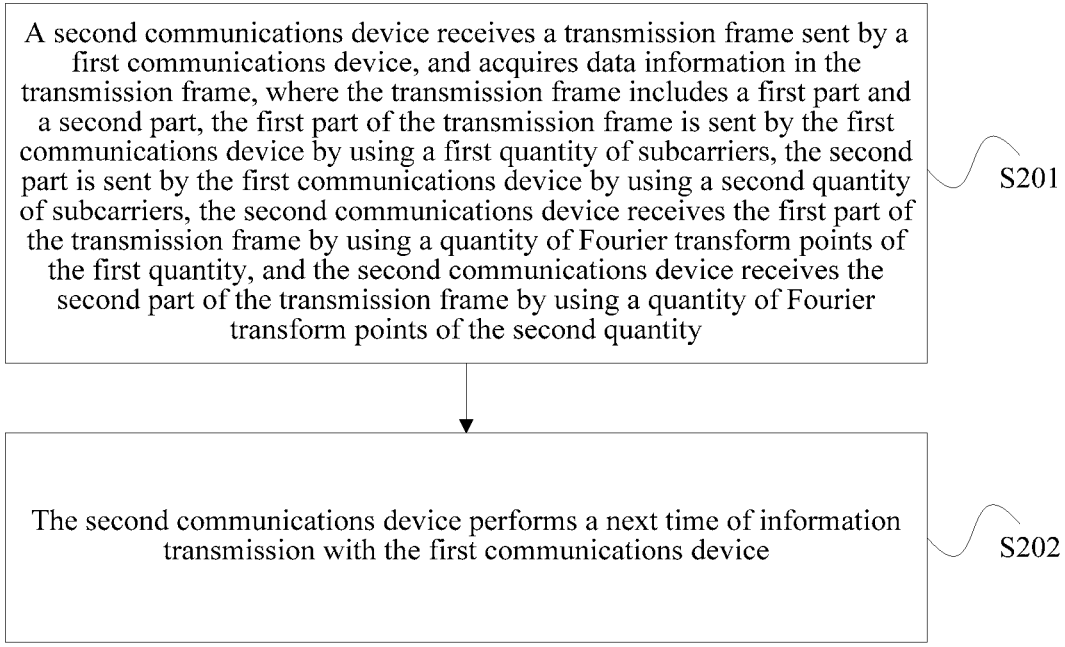
FIG. 7 is a schematic flowchart of Embodiment 2 of a data transmission method according to the present invention.

FIG. 7 is a schematic flowchart of Embodiment 2 of a data transmission method according to the present invention. The method is executed by a second communications device, where the second communications device may be the communications device in Apparatus Embodiment 3 and Embodiment 6 above. As shown in FIG. 7, the method includes:

S201: A second communications device receives a transmission frame sent by a first communications device, and acquires data information in the transmission frame, where the transmission frame includes a first part and a second part, the first part of the transmission frame is sent by the first communications device by using a first quantity of subcarriers, the second part is sent by the first communications device by using a second quantity of subcarriers, the second communications device receives the first part of the transmission frame by using Fourier transform of the first quantity, and the second communications device receives the second part of the transmission frame by using Fourier transform of the second quantity.

S202: The second communications device performs a next time of information transmission with the first communications device.

For the data transmission method provided in this embodiment of the present invention, reference may be made to an execution process of the communications device in the foregoing embodiments; an implementation principle and a technical effect of the data transmission method are similar, and details are not described herein again.

Further, the foregoing first communications device is an AP, and the foregoing second communications device is at least one STA.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

The invention claimed is:

1. A communications device, comprising:
a transceiver, configured to send a transmission frame, wherein the transmission frame comprises a first part and a second part, wherein the first part of the transmission frame comprises a preamble part of the transmission frame, the second part of the transmission frame comprises a data part of the transmission frame, wherein the data part of the transmission frame comprises scheduling information for demodulating data in the transmission frame, and the first part of the transmission frame is sent using a first quantity of subcarriers, the second part of the transmission frame is sent using a second quantity of subcarriers, the first quantity is not equal to the second quantity, a transmission bandwidth used by the first part of the transmission frame and a transmission bandwidth used by the second part of the transmission frame are equal, and a spacing of the first quantity of subcarriers is greater than a spacing of the second quantity of subcarriers.

2. The communications device according to claim 1, wherein the preamble part of the transmission frame carries demodulation information of the second part of the transmission frame.

3. The communications device according to claim 2, wherein the preamble part of the transmission frame comprises a legacy short training field (L-STF), a legacy long training field (L-LTF), legacy signaling (L-SIG), and a high efficiency wireless local area network signaling (HEW-SIG), and wherein the HEW-SIG carries the demodulation information of the second part of the transmission frame.

4. The communications device according to claim 3, wherein the demodulation information of the second part of the transmission frame comprises
at least one of subcarrier quantity information of the second part of the transmission frame or Modulation and Coding Scheme (MCS) information of the second part of the transmission frame.

5. The communications device according to claim 1, wherein the communications device is a wireless access point (AP).

6. A communications device, comprising:
a transceiver, configured to receive a transmission frame, wherein the transmission frame comprises a first part and a second part, wherein the first part of the transmission frame comprises a preamble part of the transmission frame, the second part of the transmission frame comprises a data part of the transmission frame, wherein the data part of the transmission frame comprises scheduling information for demodulating data in the transmission frame, and the first part of the transmission frame is received using Fourier transform of a first quantity of subcarriers, the second part of the transmission frame is received using Fourier transform of a second quantity of subcarriers, the first quantity is not equal to the second quantity, a transmission bandwidth used by the first part of the transmission frame and a transmission bandwidth used by the second part of the transmission frame are equal, and a spacing of the first quantity of subcarriers is greater than a spacing of the second quantity of subcarriers.

7. The communications device according to claim 6, wherein the preamble part of the transmission frame carries demodulation information of the second part of the transmission frame.

8. The communications device according to claim 7, wherein the preamble part of the transmission frame comprises a legacy short training field (L-STF), a legacy long training field (L-LTF), legacy signaling (L-SIG), and a high efficiency wireless local area network signaling (HEW-SIG), and wherein the HEW-SIG carries the demodulation information of the second part of the transmission frame.

9. The communications device according to claim 8, wherein the demodulation information of the second part of the transmission frame comprises at least one of subcarrier quantity information of the second part of the transmission frame or Modulation and Coding Scheme (MCS) information of the second part of the transmission frame.

10. The communications device according to claim 6, wherein the communications device is a user station (STA).

11. A data transmission method, comprising:
sending, by a communications device, a transmission frame, wherein the transmission frame comprises a first part and a second part, wherein the first part of the transmission frame comprises a preamble part of the transmission frame, the second part of the transmission frame comprises a data part of the transmission frame, wherein the data part of the transmission frame comprises scheduling information for demodulating data in the transmission frame, and the first part of the transmission frame is sent using a first quantity of subcarriers, the second part of the transmission frame is sent using a second quantity of subcarriers, the first quantity is not equal to the second quantity, a transmission bandwidth used by the first part of the transmission frame and a transmission bandwidth used by the second part of the transmission frame are equal, and a spacing of the first quantity of subcarriers is greater than a spacing of the second quantity of sub carriers.

12. The method according to claim 11, wherein the preamble part of the transmission frame carries demodulation information of the second part of the transmission frame.

13. The method according to claim 12, wherein the preamble part of the transmission frame comprises a legacy short training field (L-STF), a legacy long training field (L-LTF), legacy signaling (L-SIG), and a high efficiency wireless local area network signaling (HEW-SIG), and wherein the HEW-SIG carries the demodulation information of the second part of the transmission frame.

14. The method according to claim 13, wherein the demodulation information of the second part of the transmission frame comprises at least one of subcarrier quantity information of the second part of the transmission frame or Modulation and Coding Scheme (MCS) information of the second part of the transmission frame.

15. The method according to claim 11, wherein the communications device is a wireless access point (AP).

16. A data transmission method, comprising:
receiving a transmission frame, wherein the transmission frame comprises a first part and a second part, wherein the first part of the transmission frame comprises a preamble part of the transmission frame, the second part of the transmission frame comprises a data part of the transmission frame, wherein the data part of the transmission frame comprises scheduling information for demodulating data in the transmission frame, and the first part of the transmission frame is received using Fourier transform of a first quantity of subcarriers, the second part of the transmission frame is received using Fourier transform of a second quantity of subcarriers, the first quantity is not equal to the second quantity, a transmission bandwidth used by the first part of the transmission frame and a transmission bandwidth used by the second part of the transmission frame are equal, and a spacing of the first quantity of subcarriers is greater than a spacing of the second quantity of subcarriers.

17. The method according to claim 16, wherein the preamble part of the transmission frame carries demodulation information of the second part of the transmission frame.

18. The method according to claim 17, wherein the preamble part of the transmission frame comprises a legacy short training field (L-STF), a legacy long training field (L-LTF), legacy signaling (L-SIG), and a high efficiency wireless local area network signaling (HEW-SIG), and wherein the HEW-SIG carries the demodulation information of the second part of the transmission frame.

19. The method according to claim 18, wherein the demodulation information of the second part of the transmission frame comprises at least one of subcarrier quantity information of the second part of the transmission frame or Modulation and Coding Scheme (MCS) information of the second part of the transmission frame.

20. The method according to claim 16, wherein the transmission frame is received by a user station (STA).

* * * * *

UNITED STATES PATENT AND TRADEMARK OFFICE
CERTIFICATE OF CORRECTION

| | | |
|---|---|---|
| PATENT NO. | : 12,035,382 B2 | Page 1 of 1 |
| APPLICATION NO. | : 17/560011 | |
| DATED | : July 9, 2024 | |
| INVENTOR(S) | : Yalin Liu et al. | |

It is certified that error appears in the above-identified patent and that said Letters Patent is hereby corrected as shown below:

In the Claims

In Column 31, In Line 59 (Approx.), In Claim 11, delete "sub carriers." and insert -- subcarriers. --.

Signed and Sealed this
Fifth Day of November, 2024

Katherine Kelly Vidal
*Director of the United States Patent and Trademark Office*